Dec. 11, 1951     L. J. BEHR     2,578,391
SHOPPING BAG AND PANTS HANGER
Filed April 28, 1948     3 Sheets-Sheet 1
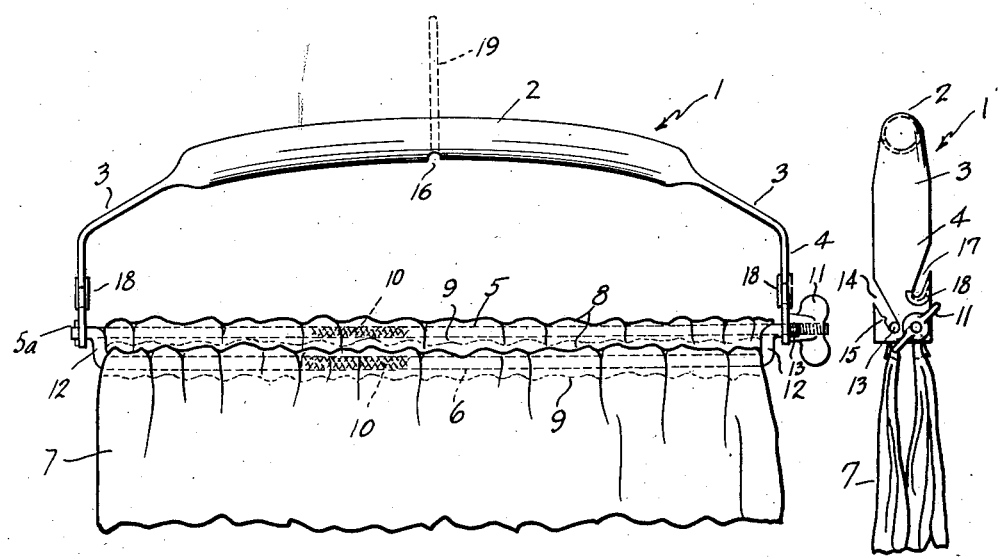
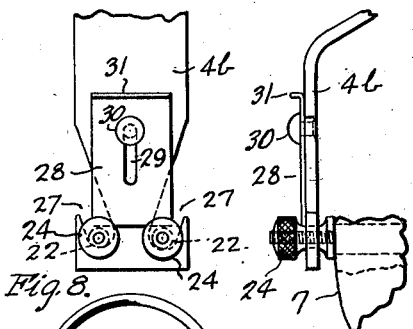
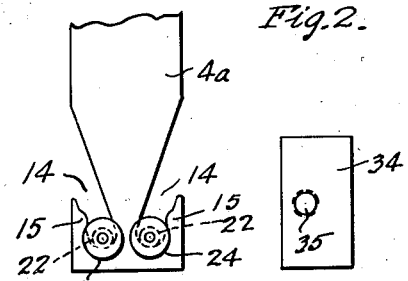
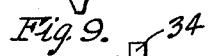
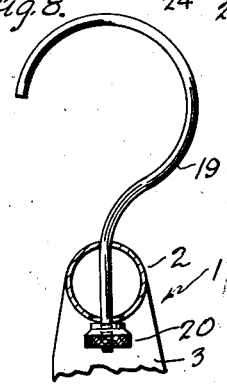
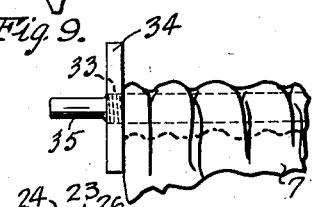
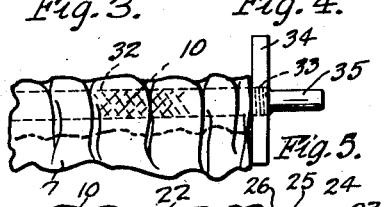
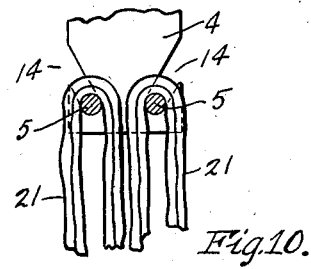
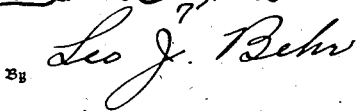

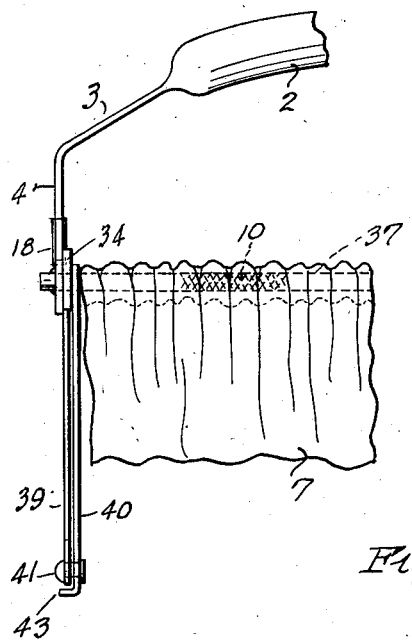
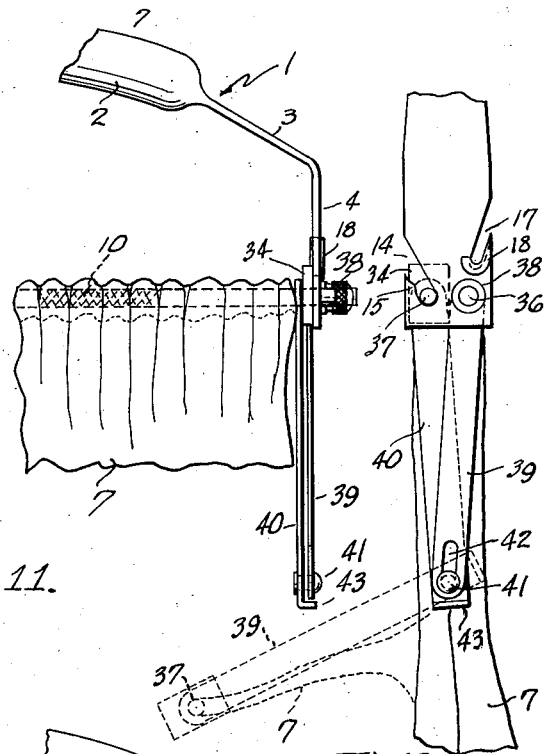
Fig. 11.
Fig. 12.
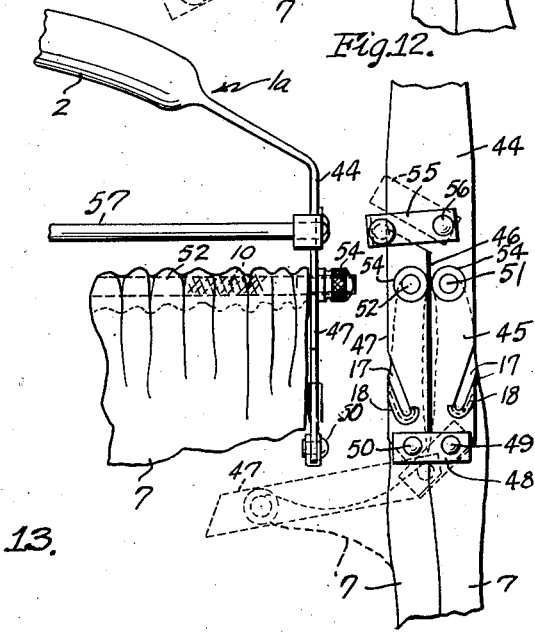
Fig. 13.
Fig. 14.
Inventor
Leo J. Behr
Attorneys Dec. 11, 1951  L. J. BEHR  2,578,391
SHOPPING BAG AND PANTS HANGER
Filed April 28, 1948  3 Sheets-Sheet 3
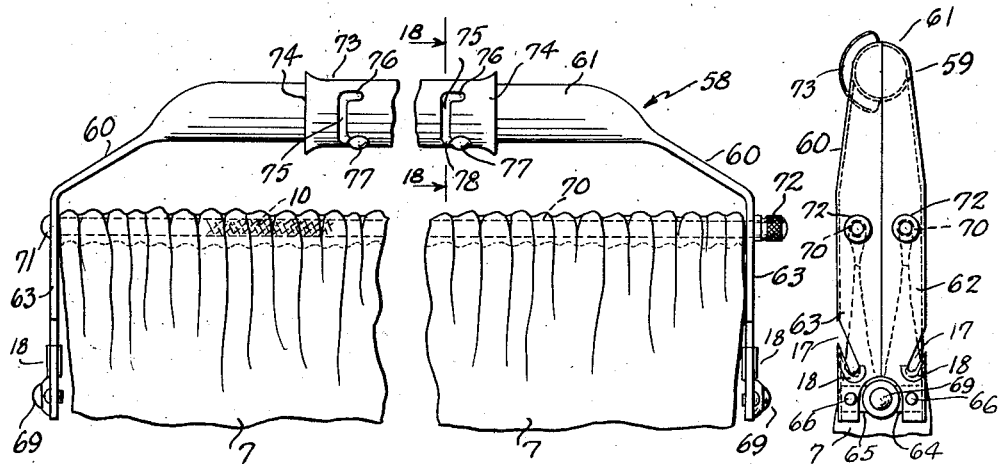
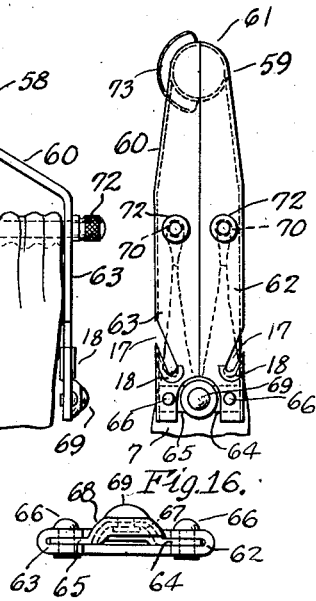
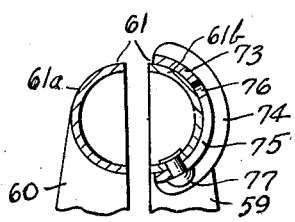
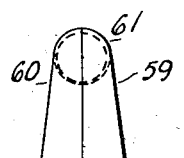
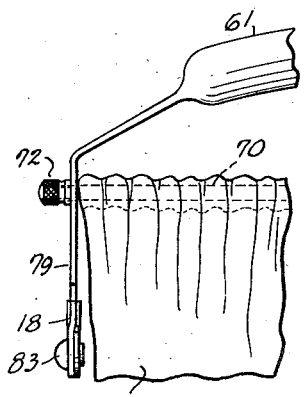
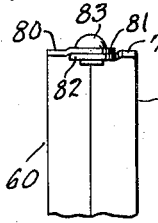
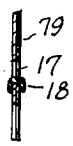
Inventor
Leo J. Behr
By Wooster & Davis Attorneys Patented Dec. 11, 1951

2,578,391

UNITED STATES PATENT OFFICE 2,578,391

SHOPPING BAG AND PANTS HANGER

Leo J. Behr, Bridgeport, Conn.

Application April 28, 1948, Serial No. 23,837

2 Claims. (Cl. 224—45)

This invention relates to a bag for shopping and similar uses, and has for an object to provide an improved and simplified construction of this type of bag wherein the cloth bag part may be readily removed from the frame for washing and cleaning purposes, and is readily replaced in the frame, without requiring the ripping of the looped hems at the top edges of the bag and subsequent restitching in replacing it in the frame.

Another object is to provide a construction of this character which may be used for carrying tied bundles which are too large or bulky for placing in the bag.

Another object is to provide a structure of bag of this type which may be used for hanging clothes if desired, such, for example, as hanging men's trousers in the clothes-closet.

Another object is to provide an improved structure which can be used to take the place of the usual type of cloth or paper shopping bag, and one which is of much stronger construction and much less apt to fail in use, and in which the cloth or bag part may be readily removed for cleaning or for changing to match dresses or other parts of clothing.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 1 is a side elevation of a shopping bag constructed according to my invention;

Fig. 2 is an end view thereof;

Fig. 3 is a partial end view showing a slight modification;

Fig. 4 is an end view of one type of bar that may be employed for supporting the bag in the frame;

Fig. 5 is a side view of the bar of Fig. 4;

Figs. 6 and 7 are similar side views of modified constructions of bars;

Fig. 8 is an end view of a modified construction of frame;

Fig. 9 is a side view looking from the right of Fig. 8;

Fig. 10 is a vertical section of the device showing how it may be employed as a clothes-hanger, particularly for hanging men's trousers;

Fig. 11 is a side view showing another modification;

Fig. 12 is an end view of the device of Fig. 11;

Fig. 13 is a side view showing a further modification;

Fig. 14 is an end view of the device of Fig. 13;

Fig. 15 is a side view showing a modified construction;

Fig. 16 is an end view looking from the right of Fig. 15;

Fig. 17 is a bottom view of the end of the frame of Figs. 15 and 16;

Fig. 18 is a detail section substantially on line 18—18 of Fig. 15 showing the catch released;

Fig. 19 is a similar section showing the catch in locking position;

Fig. 20 is an end view showing a modified construction of means for connecting the sections of the frame;

Fig. 21 is a side view of the frame of Fig. 20;

Fig. 22 is a bottom plan view thereof, and

Fig. 23 is a detail section substantially on line 23—23 of Fig. 20.

Referring first to Figs. 1 and 2, the frame comprises a substantially U-shaped handle 1 including a hollow tubular grip 2 flattened at the opposite ends 3 and bent downwardly at 4 to form substantially parallel end portions in which are mounted the rods 5 and 6 carrying the flexible bag 7, which is preferably of fabric or similar material, but may be of different material if found desirable. The frame may be of any suitable material, such as metal, particularly aluminum, or it could be of wood, plastic, or other suitable material. The opposite end portions 4 are provided with means for securing the two rods 5 and 6 for supporting the bag 7 of fabric or similar material, this bag being open at the top and provided with two longitudinal loops 8 formed by folding over the free top edges of the bag and then stitching as indicated at 9 to form a looped hem along the top edges of the bag to receive the rods 5 and 6 for supporting the bag from the frame. The rod 5, as shown in Figs. 1 and 2, is a substantially straight rod extending through openings in the opposite ends 4 of the frame with a head or some stop means, as a cotterpin 5a through one end and a removable nut, such as a thumb nut 11, at the opposite end, so that the rod is readily removable from the frame for the purpose of detaching the bag from the frame without the necessity of ripping the stitching 9. The other rod 6 may be a similar rod, but it is preferably mounted so as to be more easily disconnected from the frame to open the bag for placement of packages in it or removing them from it. This rod has a dropped or offset central portion connected by short upright end portions 12 terminating in outwardly extending ends 13 which are seated in openings through the end members of the frame, these openings being in the form of notches 14 extending inwardly and inclined downwardly from the opposite edge of the flat end portions 4 from the rod 5. These free ends are merely seated in these notches 14 and may be easily lifted up and removed from these notches in opening the bag. The offset portions 12 prevent the rod sliding longitudinally in the frame and retain it in proper position, and because of this offset it also prevents the bag from sliding longitudinally on the rod so as to slide off the ends of the rod when the bag is opened. In closing the bag all that is necessary is to reseat the ends 13 of this rod in the inclined notches 14. If desired, one end of these notches may be provided with a bump or raised portion 15 to prevent the rod dropping out of the notches inadvertently, and provide a certain amount of resistance to removal of the rod from the notches. It is also preferred to knurl or otherwise roughen the surfaces of these rods throughout their full lengths, a portion of which is indicated at 10, so that the cloth of the bag will not readily slide longitudinally on them due to the weight of the articles in the bag, but will be retained fully spread out for the full length of the rods. The grip 2 may be provided with a notch 16 in its lower side for hanging the bag and frame on a hook or other support. To adapt the device for carrying tied packages which are too large or bulky to place in the bag, either or both edges of the flat portion 4 is provided with an inwardly inclined notch 17 which may be inserted under the cord with which the package is wrapped, and then by twisting the frame and inserting the notch in the other end over the cord this device provides a very effective handle for carrying the package. To prevent the edge of the notch 17 from cutting the cord, the lower end and outer edge may be protected or covered with a rubber protection 18 seated over the edge of the notch, as shown in Fig. 2, and more in detail in Figs. 20 and 23.

This device may be also used as a hanger for hanging clothes, as indicated in Fig. 10. For this purpose a wire in the form of a loop or hook 19 may be passed through openings in the top and bottom of the grip 2 and secured by any suitable means, such as the knurled nut 20, for supporting the device from a clothes rod or other supporting means. In case the frame is used for hanging a coat or jacket, this garment may be placed over the frame the same as in any coat hanger, but if it is desired for hanging a garment such as men's trousers, the rods 5 corresponding to the rods 5 and 6 of Figs. 1 and 2 may be removed from the frame and slipped out of the hem of the bag, then replaced in the frame and used for hanging trousers indicated at 21.

A slight modification is shown in Fig. 3. In this construction the flattened end of the frame, indicated at 4a, is provided with two of the slots or notches 14 on its opposite edges to receive the rods here indicated at 22. They may be of any suitable form, as any of the forms shown in Figs. 5, 6 and 7, the form of Fig. 6 being shown. In this case both rods are the same and are mounted the same in the frame comprising a handle 1, and the notches may be provided with the raised portions or lugs 15, as described in connection with Figs. 1 and 2. These rods 22, as shown in Fig. 6, are straight rods reduced and threaded at their opposite ends as shown at 23 and on these are threaded the knurled nuts 24. These nuts are reduced as at 25 to form a groove separating the knurled hand grip portion and an inner flange 26. This flange forms a stop to prevent the bag 7 from inadvertently sliding off the rod, and the reduced portions 25 are seated in the slots 14. The two flanges on opposite sides of this reduced portion prevent the rod from sliding longitudinally on the frame as they are of greater diameter than the width of the slots 14.

In Figs. 8 and 9 is shown another arrangement to prevent the rods inadvertently becoming detached from the notches 14. In this case the notches are indicated at 27, and instead of using the reducing bump 15, a slidable catch 28 is mounted on the end 4b with its lower end adapted to seat on top of the reduced portions 25 of the nuts to retain these rods in the notches. This catch is provided with an elongated slot 29 on a suitable rivet 30 which is made sufficiently tight to provide friction to retain this catch in either the upper or lower position, but it will permit it to be slid to different positions by means of a hand grip 31 provided by bending outwardly the uper edge of the slide. To release the rods 22 all that is necessary is to slide this catch upwardly and the rods may be readily removed from the notches 27.

A modified construction of rod is shown in Figs. 4 and 5. Here the rod, indicated at 32, is a straight rod threaded at its opposite ends 33 to receive the nuts 34 in the form of elongated plates, which, when threaded onto the rod, form shoulder stops to prevent the bag 7 from inadvertently sliding off the rod, and also form stop shoulders to prevent the rod sliding longitudinally in the supporting frame and dropping out of the frame at its opposite ends. The ends are reduced somewhat as shown at 35, to seat in openings in the flattened end portions 4, whether these are round openings in the frame or notches in the side of the frame, as indicated at 14 or 27.

In Figs. 11 and 12 is shown another modified construction. Here the handle 1 of the frame is substantially the same as that of Figs. 1 and 2, but the means of mounting the bag 7 is different. It comprises two rods 36 and 37 which may be as in the other structures described, although as shown, the rod 36 is a straight rod with a knurled nut 38, while the rod 37 is the same as that shown in Figs. 4 and 5. At the opposite ends these two rods are connected by two downwardly extending links 39 and 40, these links being preferably flat strips each mounted by pivoting on one of the rods 36 or 37 and pivoted together at their lower ends by any suitable means, such as the rivet 41. One of the links, in this case the link 39, is provided with an elongated slot 42 for this rivet to permit the other link 40 and the rod 37 to which it is connected to be lifted a certain amount relative to the rod 36 to permit its removal from the notches 14 in the frame 1. The opposite upper edges of the bag 7 are supported from these two rods so that in opening the bag all the operator does is to raise the rod 37 to remove its opposite ends from the notches 14 and then permit it to move outwardly and downwardly, this upward movement being permitted by the rivet 41 sliding in the slot 42, and as the rod swings downwardly and outwardly it opens the bag for insertion or removal of articles. The lower end of the link 40 is bent laterally under the link 39 to form a limit stop 43 to limit downward movement of the link 39, so that it does not fall all the way down vertically, but in the open position extends laterally to hold the top of the bag open.

In Figs. 13 and 14 is shown another modification. In this form the flattened end portion 44 of the frame 1a is extended downwardly further than in the forms so far described to form an extension 45 and one side is cut out, as shown at 46, to receive a link 47. This link is seated in the notch or recess 46, and is pivoted at its lower end to the extension 45. In the form of Figs. 13 and 14 this connecting pivot means is a short U-shaped link 48 embracing the lower ends of extension 45 and the link 47 and pivoted to them by suitable rivets 49 and 50. This permits the link 47 to swing downwardly and outwardly, as shown in dotted lines in Fig. 14, and the lower connecting bar of the U-shaped hinge member 48 acts as a stop means to engage the lower end of the extension 45 and the side of the link 47 to limit this movement, so as to hold the upper end of the bag in the open position. The bag indicated at 7 is supported from rods 51 and 52 mounted in the extension 45 and the links 47, and these rods may be of any of the forms shown, but that shown in Figs. 13 and 14 comprises a straight rod with a head 53 in the extension 45 and the link 47 at the other end of the frame, and a removable knurled nut 54 at the opposite end threaded on each rod so that it may be readily removed to permit removal of the rods and the bag from the frame, for cleaning, washing or other purpose, or for merely changing the bag. A suitable catch is provided for holding these links 47 in the recesses 46 when the bag is closed. This comprises an angularly shaped catch member 55 pivoted to each of the ends 44 of the frame at 56 with their free ends connected by a transverse rod 57. When in the lower position this rod lies over the upper ends of the links 47 to retain them in the recesses 46, and by merely lifting the rod these links are released to permit opening of the bag.

In the form of Figs. 15 to 19, the handle portion of the frame, instead of being in one piece, as in the forms so far described, but indicated as a whole at 58, is slit longitudinally to divide it in two sections 59 and 60. The grip portion 61 is a substantially tubular portion composed of two semi-circular halves 61a and 61b arranged with their edges together to form a substantially circular grip, and the opposite ends are flattened and bent downwardly to form opposite parallel end portions 62 and 63, which when the frame or handle is closed, as in Figs. 15 and 16, lie with their inner edges together, but as they are formed from substantially semi-circular members, that makes these members 62 and 63 substantially U-shape in cross section, as shown in Fig. 17. They are pivoted together at their lower ends by any suitable means, in the arrangement shown by means of two links 64 and 65, having flattened ends extending between the sides of the flat portions 62 and 63 and secured by suitable rivets 66. These members are cupped laterally at their inner ends and seated one within the other, as indicated at 67 and 68, to form a substantially semi-spherical bearing, and are connected by a hinge rivet 69. This connection permits the two sections of the handle to swing outwardly and downwardly in opposite directions about the pivot rivet 69, or if one is held in an upright position the other may swing outwardly and downwardly to a substantially horizontal position to open the bag.

The bag, indicated at 7, is mounted on two rods 70, mounted one in each of the flattened end portions 62 and 63, the rods shown being substantially the same as the rods 51 and 52 of Fig. 13. That is, they are straight rods with a head 71 at one end and knurled nut 72 threaded on the opposite end to retain them in the members of the frame, but permit easy removal to disconnect the bag from the frame for cleaning or renewal without opening the looped hem at the top edges of the bag.

To hold the two separable members of the handle together when in the closed position, it is provided with a combined locking means and grip 73. This comprises a semi-tubular member mounted on and fitting the outside of one of the sections of the grip 61. It is long enough to form a hand grip and is flared outwardly at its opposite ends 74. It is provided adjacent each end with a U-shaped slot 75, the intermediate portion of the slot extending transversely around the grip, and the ends 76 extending longitudinally in the same direction, and in each of these slots is a rivet 77 mounted in one of the sections of the handle 61. This slot permits the grip 73 to be turned through an arc of 90° so that, as shown in Figs. 15, 16 and 18, it lies on the outer side of one of the sections of the hand grip and is held in this position by the rivets 77 being in the lateral end portions 78 of the slots 75. This permits separating of the two sides of the handle to open the bag, but after they are brought together to close the bag the grip 73 may be slid longitudinally a short distance to bring the rivets 77 in the transverse portion of the slots 75, permitting the grip to be turned through an arc of 90° to a position under the handle as shown in Fig. 19, at which time it may be slid longitudinally a short distance to bring the rivet 77 into the lateral portion 76 of the slot 75. In this position it will be seen the grip 73 overlaps each of the half-sections of the grip 61, and therefore locks them together to prevent opening of the bag. The grip 73, as it is semi-circular and overlaps the sections of the handle 61, protects the hands of the user from injury from the joint in the handle 61 and provides a comfortable grip for carrying the bag, as well as a lock for locking the two sections of the handle together. It may be released to permit opening of the bag by a mere reversed operation of that described in closing.

Figs. 20, 21 and 22 show another slight modification, in which the handle part of the frame is substantially that shown in Figs. 15 to 19, except the locking hand grip is omitted, these views being shown merely to disclose a modified hinge construction in place of that shown in Figs. 15 to 17. In this arrangement the lower end of the flattened side portions 79 and 80 are bent laterally inwardly toward each other, as indicated at 81 and 82, and overlapped and connected by a hinge rivet 83. Each of the inwardly bent ends 81 and 82 are offset laterally half the thickness of the flattened portion, as indicated in Figs. 21 and 22, so as to permit the two flattened portions 79 and 80 to lie in the same plane. The bag and the rods for mounting it in the frame are the same as shown in Figs. 15 to 17, and as previously stated, the same locking means and grip 73 may be used in this construction as that in Figs. 15 to 19.

The form of Fig. 23 is merely to show the guard for the various inclined notches in the various forms to permit use of the device for carrying packages too large or bulky to go into the bag, as previously described, this guard preventing the string being cut by the side edges of the notch.

It will be seen from the above that in all forms the flexible bag may be easily and quickly removed from the frame and carrying handle by merely detaching the rods and sliding them out of the looped hems at the top edges of the bag, and this may be done without ripping the seam forming this hem. Therefore, the operation of detaching the bag may be performed easily and quickly, and the operation of reinserting it in the handle and frame as easily and quickly and without requiring the stitching of a new hem. The operator may therefore easily and quickly remove the bag for cleaning, washing, or for renewing, and as this can be easily and quickly accomplished this operation would be performed more often, tending to assist in keeping the bag clean and sanitary. It will, of course, be understood the bag is not necessarily limited to use as a shopping bag, but if desired, may be used as a knitting bag, pocket-book or any other use desired. Also, the flexible bag part is not limited to being made of cloth, as it could be made of any flexible material, such, for example, as leather, plastic, or even stout paper. In all forms it is preferred to knurl or roughen the bag-supporting rods to provide a grip on the material of the bag to prevent its sliding on the rod and gathering at one end, or that is, to maintain it spread out over the length of the rod as it should be. The bags cannot only be easily changed for cleaning and washing purposes, but can be easily changed to match the clothing of the user, as, for example, a bag to match the user's dress, or in making a dress the left-over material can be used for the bag to make a bag to match the dress. With this construction also, the user can have a number of different bags to match different dresses or particularly adapted for different uses, and they may be readily changed in the frame as found desirable.

In all forms the supporting rods for the bag have shoulders at their ends to form a stop for the end of the looped hem to prevent the rod inadvertently sliding out of this hem. Thus, in Figs. 1 and 7, this stop shoulder is the offset 12, in Fig. 5 it is the element 34, and in Figs. 6 and 9 it is the flange 26 of the knurled nut.

Having thus set forth the nature of my invention, I claim:

1. A device of the character described comprising a frame including a handle with spaced substantially parallel end members extending laterally therefrom, a pair of supporting rods extending between the end members adapted for supporting a flexible bag member looped about the rods, said end members being provided with openings into which the rods extend, stop shoulders on the rods adjacent the end members and extending laterally from the rods to retain them against longitudinal movement out of the openings and located outside the bag loops to retain the bag on the rods when the rods are removed from the frame, and securing means for the rods adapted to be easily released to permit easy removal of the rods from the frame.

2. A bag of the character described comprising a frame including a handle with spaced end members extending laterally from the opposite ends thereof, separate members independent of the handle pivoted to the end members adjacent their lower ends to permit their upper ends to swing downwardly and outwardly from the end members, releasable holding members secured to the end members to retain the pivoted members in their upper positions, an operating bar connecting said holding members and located adjacent the handle, supporting rods mounted in and extending between the end members and the upper part of the pivoted members respectively, easily releasable means securing the rods in said members to permit easy removal of the rods, and a flexible bag open at the top and provided with looped hems along its upper edges embracing the respective rods to support the bag.

LEO J. BEHR.

REFERENCES CITED

The following references are of record in the file of this patent:

UNITED STATES PATENTS

| Number | Name | Date |
| --- | --- | --- |
| 556,877 | Beers | Mar. 24, 1896 |
| 792,204 | Downing | June 13, 1905 |
| 884,617 | Schlang | Apr. 14, 1908 |
| 1,537,210 | Wood | May 12, 1925 |
| 1,826,976 | Wright | Oct. 13, 1931 |
| 2,036,608 | Rosenberg | Apr. 7, 1936 |
| 2,051,413 | Lowenstein | Aug. 18, 1936 |
| 2,083,029 | Lowy | June 8, 1937 |
| 2,170,841 | Thies et al. | Aug. 29, 1939 |
| 2,197,618 | Megdall | Apr. 16, 1940 |

FOREIGN PATENTS

| Number | Country | Date |
| --- | --- | --- |
| 689,842 | France | June 3, 1930 |